US012664989B2

(12) United States Patent
Lee

(10) Patent No.: US 12,664,989 B2
(45) Date of Patent: Jun. 23, 2026

(54) SPEAKER RECOGNITION DEVICE AND OPERATING METHOD THEREOF

(71) Applicant: LG ELECTRONICS INC., Seoul (KR)

(72) Inventor: Sang Seok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

(21) Appl. No.: 18/585,227

(22) Filed: Feb. 23, 2024

(65) Prior Publication Data

US 2025/0140261 A1 May 1, 2025

(30) Foreign Application Priority Data

Oct. 30, 2023 (KR) ........................ 10-2023-0147258

(51) Int. Cl.

| | |
|---|---|
| ***G10L 17/06*** | (2013.01) |
| ***G06F 3/16*** | (2006.01) |
| ***G10L 17/02*** | (2013.01) |
| ***G10L 17/04*** | (2013.01) |
| ***G10L 17/08*** | (2013.01) |
| ***G10L 17/22*** | (2013.01) |

(52) U.S. Cl.

CPC .............. *G10L 17/06* (2013.01); *G06F 3/167* (2013.01); *G10L 17/02* (2013.01); *G10L 17/04* (2013.01); *G10L 17/08* (2013.01); *G10L 17/22* (2013.01)

(58) Field of Classification Search

CPC ......... G10L 17/06; G10L 17/02; G10L 17/04; G10L 17/08; G10L 17/22; G06F 3/167

USPC .......................................................... 704/244

See application file for complete search history.

(56) References Cited

U.S. PATENT DOCUMENTS

| | | | | |
|---|---|---|---|---|
| 11,019,553 | B1 * | 5/2021 | Bhambhani | H04W 36/00224 |
| 2018/0158460 | A1 * | 6/2018 | Lee | G10L 15/22 |
| 2018/0182389 | A1 * | 6/2018 | Devaraj | G10L 17/06 |
| 2018/0232201 | A1 * | 8/2018 | Holtmann | G01S 5/28 |
| 2020/0162255 | A1 * | 5/2020 | Hunt | H04L 63/083 |
| 2020/0302423 | A1 * | 9/2020 | Vijayaraghavan | G06Q 20/322 |
| 2021/0051148 | A1 * | 2/2021 | Parikh | H04L 67/60 |
| 2023/0016655 | A1 * | 1/2023 | Itakura | G10L 17/26 |
| 2023/0420214 | A1 * | 12/2023 | Komatsuzaki | H01J 37/222 |
| 2024/0013784 | A1 * | 1/2024 | Chen | G10L 15/22 |
| 2025/0140261 | A1 * | 5/2025 | Lee | G10L 17/06 |
| 2025/0168445 | A1 * | 5/2025 | Wang | H04N 21/4394 |

FOREIGN PATENT DOCUMENTS

| | | | | |
|---|---|---|---|---|
| EP | 3627505 A1 * | 3/2020 | | H04M 3/568 |
| KR | 10-2141150 B1 | 8/2020 | | |

* cited by examiner

*Primary Examiner* — Edwin S Leland, III

(74) *Attorney, Agent, or Firm* — Birch, Stewart, Kolasch & Birch, LLP

(57) ABSTRACT

An object of the present disclosure is to ensure speaker recognition performance even if voice uttered by a voice input device different from a voice input device of voice uttered in a speaker registration process.

9 Claims, 13 Drawing Sheets

| | |
|---|---|
| 1 | When this program is over, play Stranger Things |
| 2 | Turn off the TV when this program ends |
| 3 | When this program is over, turn on channel 6 |
| 4 | Show me tv programs that start at 7 pm |
| 5 | When this program is over, turn to NBC |
| 6 | Show me my pictures on the TV |

Would you like to do simple registration for new voice input channel?

YES     NO

It looks similar to already registered speaker A. Is speaker A correct?

YES     NO

SPEAKER RECOGNITION DEVICE AND OPERATING METHOD THEREOF

CROSS-REFERENCE TO RELATED APPLICATION

This application is the Korean Patent Application No. 10-2023-0147258, filed on Oct. 30, 2023, all of which are hereby expressly incorporated by reference into the present application.

BACKGROUND

Technical Field

The present disclosure relates to a speaker recognition device, and more particularly, to a speaker recognition device for recognizing a speaker through a plurality of voice input devices.

Discussion of the Related Art

Speaker recognition service refers to a service that identifies and distinguishes specific speakers using voice recognition technology. The speaker recognition service may be used in a variety of application fields and may be utilized in security, education, voice commands, and automation systems.

The speaker recognition service analyzes the characteristics of voice uttered by a speaker, stores a unique voice pattern of each speaker, and identifies the speaker based on the stored voice pattern.

For the speaker recognition service, a speaker registration process is required to register voice of a speaker. In the speaker registration process, keywords are provided to increase the accuracy of voice recognition.

The speaker utters a keyword, and a voice recognition device such as a mobile device or a TV identifies the speaker by recognizing the uttered keyword.

Speaker-dependent speaker recognition includes a speaker registration process, which registers a speaker through the voice uttered by a user by uttering a presented sentence, and a speaker identification process, which determines whether the speaker is registered through voice uttered while using the voice recognition service.

There are various voice input devices (remote control device, long-distance microphone, headset, mobile device, and the like) for voice recognition of a speaker.

However, the acoustic characteristics of a microphone are different for each voice input device, and thus when an input device of voice uttered in the speaker registration process and an input device of voice uttered in the speaker identification process are different, speaker recognition may not be achieved well due to a difference in microphone performance.

SUMMARY

An object of the present disclosure is to ensure speaker recognition performance even if voice uttered by a voice input device different from a voice input device of voice uttered in a speaker registration process.

An object of the present disclosure is to improve speaker recognition performance by storing the features of a voice input device that is not registered in the speaker identification process and voices received through the voice input device.

According to an embodiment of the present disclosure, a speaker recognition device includes a communication interface configured to communicate with an electronic device, a memory configured to store a speaker profile including a first voice feature set including voice features of a first voice signal and a first voice input channel matched to the first voice signal, and a processor configured to receive a second voice signal corresponding to receive a voice command uttered by a speaker and information on a second voice input channel indicating a device obtaining the voice command, from an electronic device, obtain a similarity between the first voice feature set and a second voice feature set including voice features of the second voice signal, based on that the second voice input channel is not the first voice input channel stored in the memory, and transmit a notification indicating that the speaker is identified, to the electronic device, based on the obtained similarity being equal to or greater than a first similarity.

The processor may compare a first embedding vector indicating the first voice feature set with a second embedding vector indicating the second voice feature set to obtain the similarity.

Based on that the similarity is less than the first similarity and is equal to or greater than a second similarity less than the first similarity, the processor may be configured to transmit a notification for checking that the speaker is matched to a pre-registered speaker, to the electronic device.

Based on that the similarity is less than the first similarity and is equal to or greater than a second similarity less than the first similarity, the processor may be configured to transmit a notification for registering the second voice input channel to the electronic device.

The processor may be configured to obtain additional voice features of an additional voice signal corresponding to an additional voice command obtained through the second voice input channel, from the electronic device, and update the information on the second voice input channel and the additional voice features, to the speaker profile.

Based on that the similarity is less than the first similarity and is equal to or greater than a second similarity less than the first similarity, the processor may be configured to transmit a notification inducing additional utterance of a keyword to the electronic device through the first voice input channel.

Based on the similarity being less than the second similarity, the processor may be configured to transmit a notification for registering a new speaker to the electronic device.

Each of the first voice input channel and the second voice input channel may include any one of a remote control device, the electronic device, and a mobile device, each including a microphone.

According to an embodiment of the present disclosure, an operating method of a speaker recognition device includes storing a speaker profile including a first voice feature set including voice features of a first voice signal and a first voice input channel matched to the first voice signal, receiving a second voice signal corresponding to receive a voice command uttered by a speaker and information on a second voice input channel indicating a device obtaining the voice command, from an electronic device, obtaining a similarity between the first voice feature set and a second voice feature set including voice features of the second voice signal, based on that the second voice input channel is not the stored first voice input channel, and transmitting a notification indicating that the speaker is identified, to the electronic device, based on the obtained similarity being equal to or greater than a first similarity.

The obtaining of the similarity may include comparing a first embedding vector indicating the first voice feature set with a second embedding vector indicating the second voice feature set to obtain the similarity.

The method may further include, based on that the similarity is less than the first similarity and is equal to or greater than a second similarity less than the first similarity, transmitting a notification for checking that the speaker is matched to a pre-registered speaker, to the electronic device.

The method may further include based on that the similarity is less than the first similarity and is equal to or greater than a second similarity less than the first similarity, transmitting a notification for registering the second voice input channel to the electronic device.

The method may further include obtaining additional voice features of an additional voice signal corresponding to an additional voice command obtained through the second voice input channel, from the electronic device, and updating the information on the second voice input channel and the additional voice features, to the speaker profile.

The method may further include, based on that the similarity is less than the first similarity and is equal to or greater than a second similarity less than the first similarity, transmitting a notification inducing additional utterance of a keyword to the electronic device through the first voice input channel.

The method may further include, based on the similarity being less than the second similarity, transmitting a notification for registering a new speaker to the electronic device.

Advantageous Effects

According to an embodiment of the present disclosure, speaker recognition may be normally performed even if a speaker utters voice through any channel of a plurality of voice input channels.

That is, according to an embodiment of the present disclosure, speaker recognition performance may be improved even if a speaker utters voice through various voice input channels.

DETAILED DESCRIPTION OF THE EMBODIMENTS

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

A display device according to an embodiment of the present disclosure is, for example, an intelligent display device that adds a computer supporting function to a broadcast receiving function, and may have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS may be used.

Accordingly, since various applications are freely added or deleted on a general purpose OS kernel, a display device described herein, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
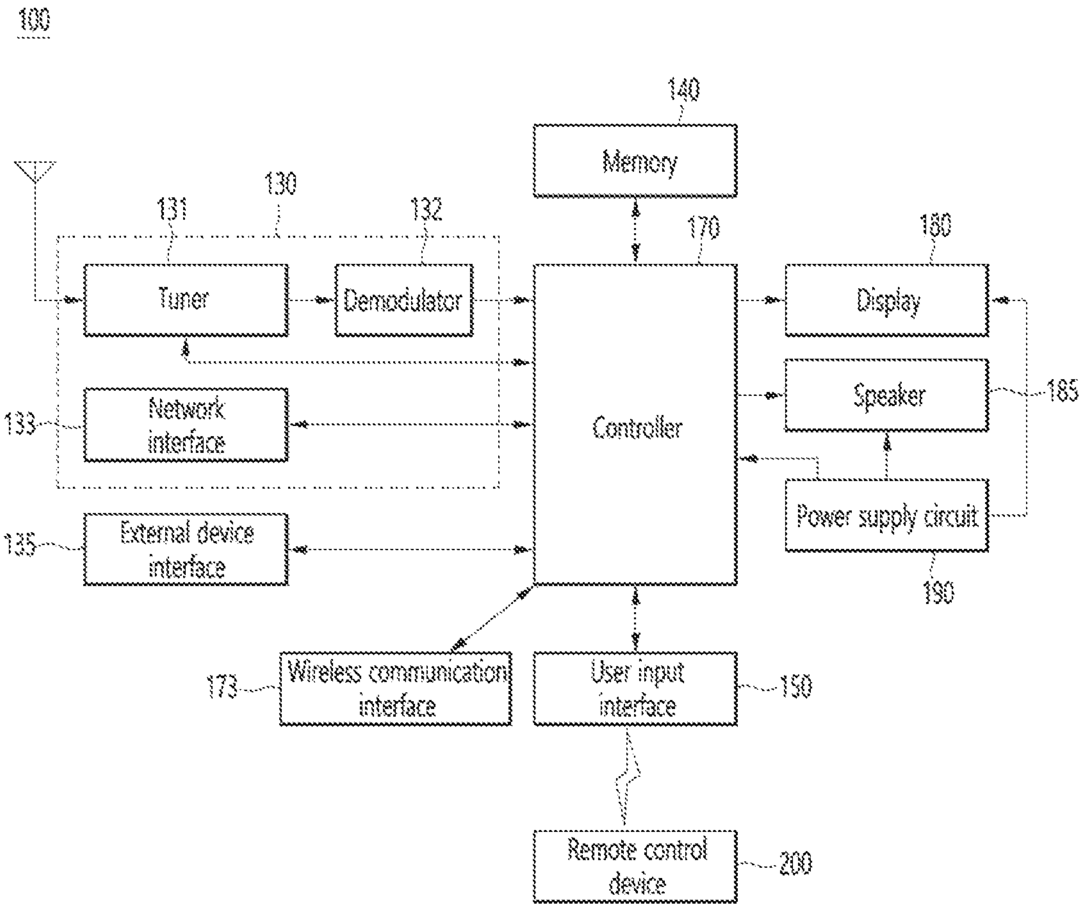
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a storage 140, a user interface 150, a controller 170, a wireless communication interface 173, a display 180, an audio output interface 185, and a power supply 190.

The broadcast receiver 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program-related data signals, and may restore the divided video signals, audio signals, and data signals into the form capable of being output.

The external device interface 135 may receive an application or an application list in an adjacent external device, and may transmit the application or the application list to the controller 170 or the storage 140.

The external device interface 135 may provide a connection path between the display device 100 and the external device. The external device interface 135 may receive at least one an image or audio output from the external device that is wirelessly or wiredly connected to the display device 100, and may transmit the image and/or the audio to the controller 170. The external device interface 135 may include a plurality of external input terminals. The plurality of external input terminals may include an RGB terminal, at least one High Definition Multimedia Interface (HDMI) terminal, and a component terminal.

An image signal of the external device input through the external device interface 135 may be output through the display 180. A voice signal of the external device input through the external device interface 135 may be output through the audio output interface 185.

An external device connectable to the external device interface 135 may be one of a set-top box, a Blu-ray player, a DVD player, a game console, a sound bar, a smartphone, a PC, a USB memory, and a home theater system, but this is just exemplary.

The network interface 133 may provide an interface for connecting the display device 100 to a wired/wireless network including an Internet network. The network interface 133 may transmit or receive data to or from another user or another electronic device through an accessed network or another network linked to the accessed network.

In addition, some content data stored in the display device 100 may be transmitted to a user or an electronic device, which is selected from other users or other electronic devices preregistered in the display device 100.

The network interface 133 may access a predetermined webpage through an accessed network or another network linked to the accessed network. That is, the network interface 133 may transmit or receive data to or from a corresponding server by accessing a predetermined webpage through the network.

The network interface 133 may receive content or data provided from a content provider or a network operator. That is, the network interface 133 may receive content, such as movies, advertisements, games, VODs, and broadcast signals, which are provided from the content provider or the network operator, and information relating thereto through the network.

In addition, the network interface 133 may receive firmware update information and update files provided from the network operator, and may transmit data to the Internet or content provider or the network operator.

The network interface 133 may select and receive a desired application among applications open to the air, through the network.

The storage 140 may store signal-processed image, voice, or data signals stored by a program in order for each signal processing and control in the controller 170.

In addition, the storage 140 may perform a function for temporarily storing image, voice, or data signals output from the external device interface 135 or the network interface 133, and may store information on a predetermined image through a channel memory function.

The storage 140 may store an application or an application list input from the external device interface 135 or the network interface 133.

The display device 100 may play content files (e.g., video files, still image files, music files, document files, application files, etc.) stored in the storage 140, and may provide the content files to a user.

The user input interface 150 may transmit signals input by a user to the controller 170, or may transmit signals from the controller 170 to a user. For example, the user input interface 150 may receive or process control signals such as power on/off, channel selection, and screen setting from a remote control device 200 or transmit control signals from the controller 170 to the remote control device 200 according to various communication methods such as Bluetooth, Ultra Wideband (WB), ZigBee, Radio Frequency (RF), and IR communication methods.

In addition, the user input interface 150 may transmit, to the controller 170, control signals input from local keys (not shown) such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface 135.

Voice signals processed by the controller 170 may be output to the audio output interface 185. In addition, voice signals processed by the controller 170 may be input to the external output device through the external device interface 135.

Additionally, the controller 170 may control overall operations of the display device 100.

In addition, the controller 170 may control the display device 100 by a user command or an internal program input through the user input interface 150, and may access the network to download a desired application or application list into the display device 100.

The controller 170 may output channel information selected by a user together with the processed image or voice signals through the display 180 or the audio output interface 185.

In addition, the controller 170 may output image signals or voice signals of an external device such as a camera or a camcorder, which are input through the external device interface 135, through the display 180 or the audio output interface 185, according to an external device image playback command received through the user input interface 150.

Moreover, the controller 170 may control the display 180 to display images, and may control the display 180 to display broadcast images input through the tuner 131, external input images input through the external device interface 135, images input through the network interface, or images stored in the storage 140. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communication module 173 may perform wired or wireless communication with an external device. The wireless communication module 173 may perform short-range communication with an external device. For this, the wireless communication interface 173 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication module 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication module 173 may detect (or recognize) a wearable device capable of communication around the display device 100.

Furthermore, if the detected wearable device is a device authenticated to communicate with the display device 100, the controller 170 may transmit at least part of data processed in the display device 100 to the wearable device through the wireless communication interface 173. Therefore, a user of the wearable device may use the data processed by the display device 100 through the wearable device.

The display 180 may convert image signals, data signals, or on-screen display (OSD) signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present disclosure described below may be performed by one of the display device described with reference to FIG. 1, an image processing device such as the separated set-top box, and a content playback device including the display 180 and the audio output interface 185.

A remote control device according to an embodiment of the present disclosure will be described with reference to FIGS. 2 and 3.

Figure 2:
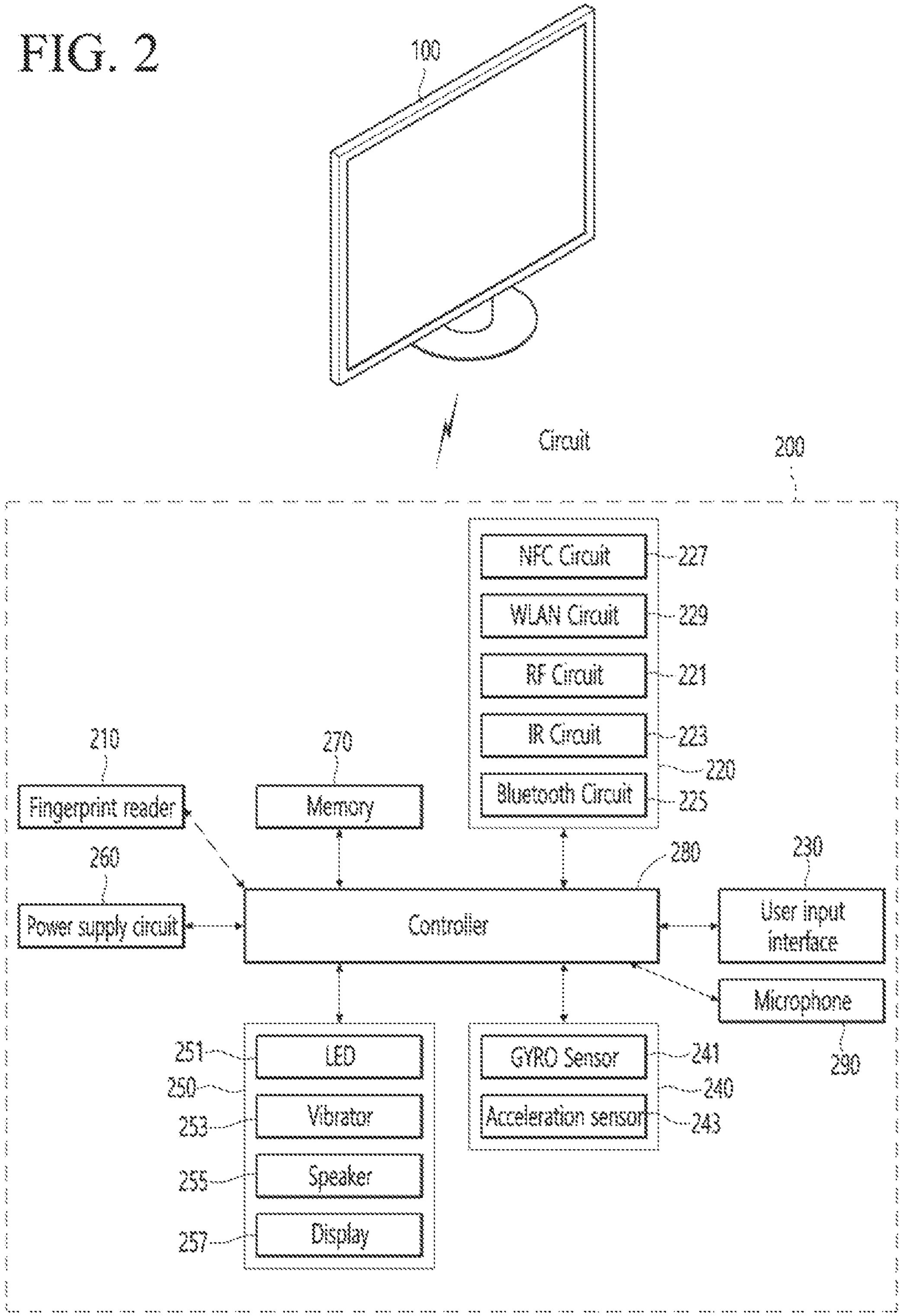
FIG. 2 is a block diagram illustrating a remote control device according to an embodiment of the present disclosure.
Figure 3:
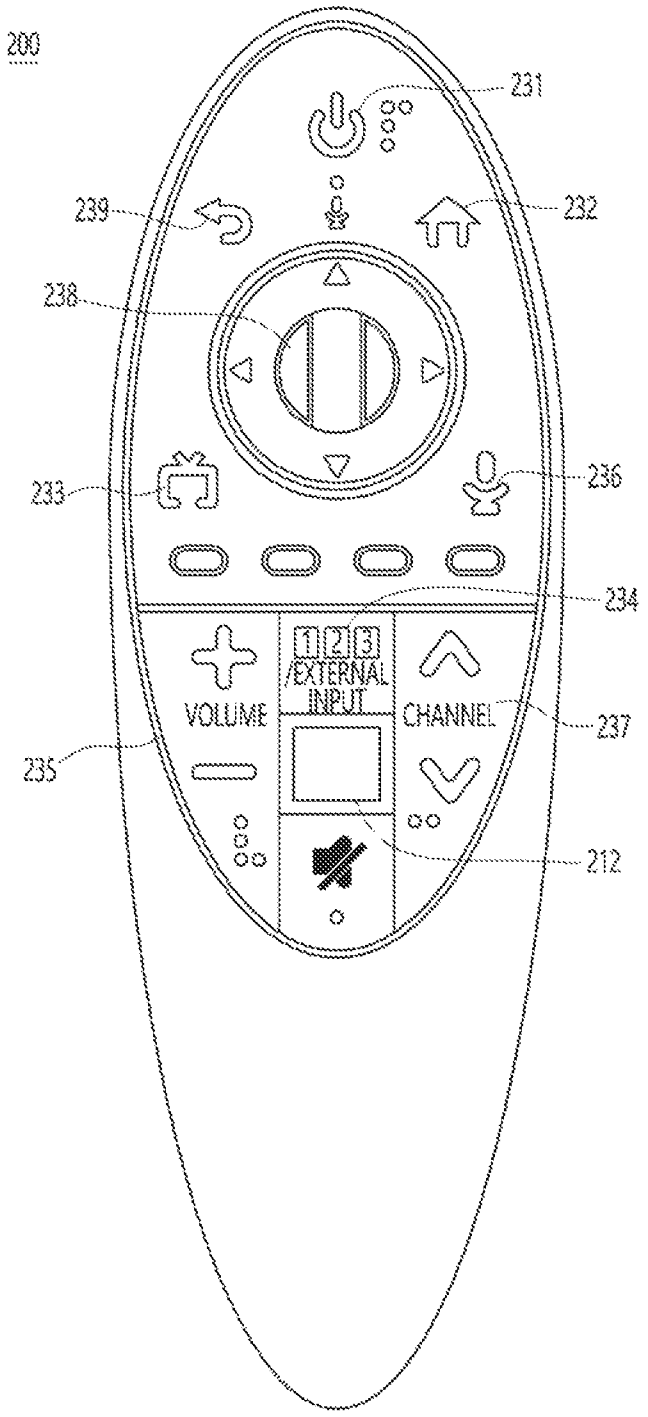
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognizer 210, a wireless communication module 220, a user input interface 230, a sensor module 240, an output interface 250, a power supply 260, a storage 270, a controller 280, and a voice acquirer 290.

Referring to FIG. 2, the wireless communication interface 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication module 220.

Moreover, the remote control device 200 may receive signals transmitted from the display device 100 through the RF module 221 and if necessary, may transmit a command for power on/off, channel change, and volume change to the display device 100 through the IR module 223.

The user input interface 230 may be configured with a keypad, a button, a touch pad, or a touch screen. A user may operate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation.

The power button 231 may be a button for turning on/off the power of the display device 100.

The home button 232 may be a button for moving to the home screen of the display device 100.

The live button 233 may be a button for displaying live broadcast programs.

The external input button 234 may be a button for receiving an external input connected to the display device 100.

The volume control button 235 may be a button for controlling a volume output from the display device 100.

The voice recognition button 236 may be a button for receiving user's voice and recognizing the received voice.

The channel change button 237 may be a button for receiving broadcast signals of a specific broadcast channel.

The OK button 238 may be a button for selecting a specific function, and the back button 239 may be a button for returning to a previous screen.

FIG. 2 is described again.

If the user input interface 230 includes a touch screen, a user may touch a soft key of the touch screen to input a command relating to the display device 100 to the remote control device 200. In addition, the user input interface 230 may include various kinds of input interfaces operable by a user, for example, a scroll key and a jog key, and this embodiment does not limit the scope of the present disclosure.

The sensor module 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display 180 of the display device 100.

The output interface 250 may output image or voice signals in response to the operation of the user input interface 235, or may output image or voice signals corresponding to signals transmitted from the display device 100.

A user may recognize whether the user input interface 235 is operated or the display device 100 is controlled through the output interface 250.

For example, the output interface 250 may include an LED module 251 for flashing, a vibration module 253 for generating vibration, a sound output module 255 for outputting sound, or a display module 257 for outputting an image, if the user input interface 235 is manipulated or signals are transmitted/received to/from the display device 100 through the wireless communication interface 225.

Additionally, the power supply 260 supplies power to the remote control device 200 and if the remote control device 200 does not move for a predetermined time, stops the power supply, so that power waste may be reduced.

The power supply 260 may resume the supply of power if a predetermined key provided at the remote control device 200 is operated.

The storage 270 may store various kinds of programs and application data required to control or operate the remote control device 200.

If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage 270, information on a frequency band for transmitting/receiving signals to/from the display device 100 paired with the remote control device 200 and refer to it.

The controller 280 controls general matters relating to the control of the remote control device 200. The controller 280 may transmit a signal corresponding to a predetermined key operation of the user input interface 235 or a signal corresponding to the movement of the remote control device 200 sensed by the sensor module 240 to the display device 100 through the wireless communication module 225.

In addition, the voice acquirer 290 of the remote control device 200 may acquire voice.

The voice acquirer 290 may include at least one microphone and acquire voice through the microphone.

Figure 4:
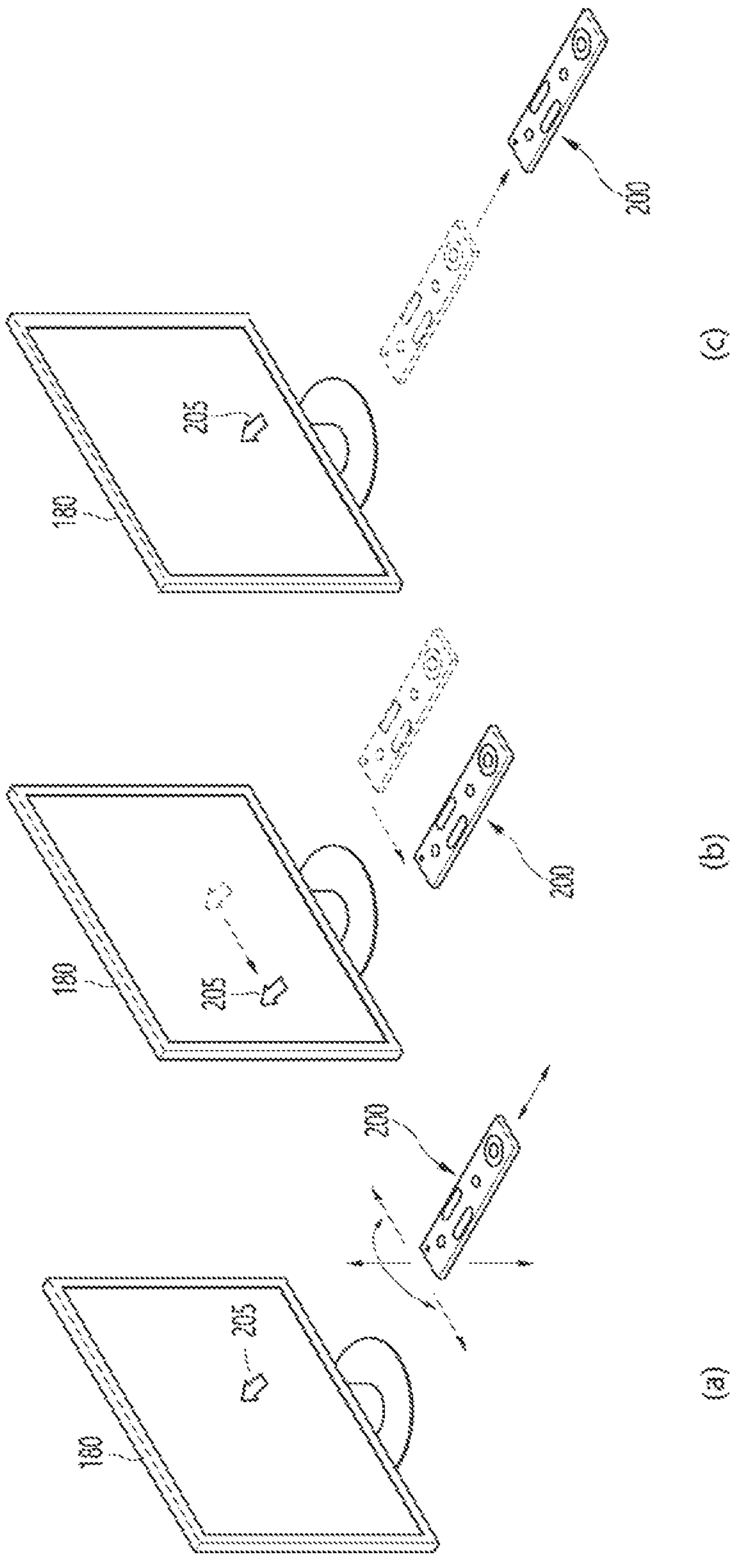
FIG. 4 is a view of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display 180. Thus, a selected region in the display 180 corresponding to the pointer 205 may be zoomed in and displayed in an enlarged size.

On the other hand, if a user moves the remote control device 200 close to the display 180, a selection area in the display 180 corresponding to the pointer 205 may be zoomed out and displayed in a reduced size.

On the other hand, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. That is, if the remote control device 200 is moved away from or closer to the display 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
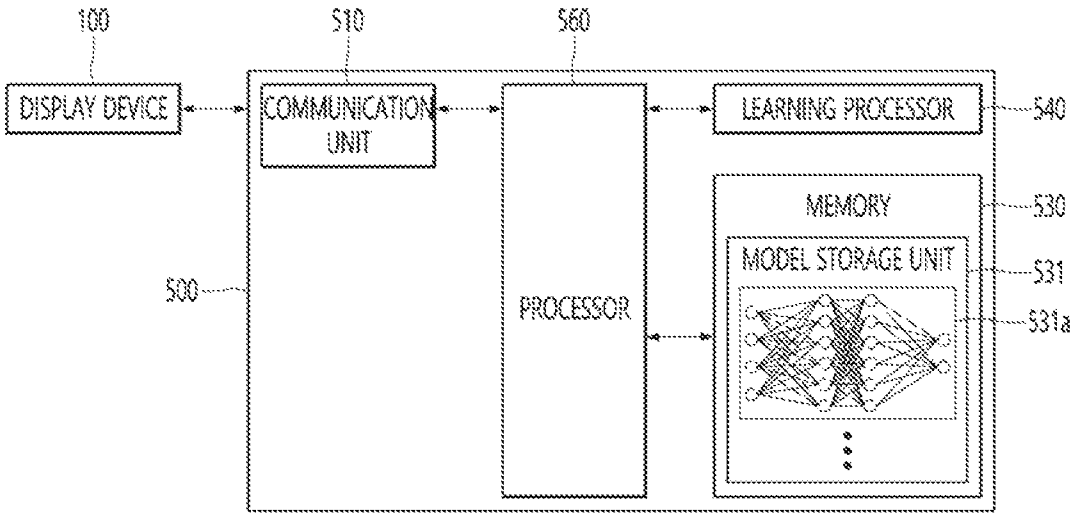
FIG. 5 illustrates an artificial intelligence (AI) server according to an embodiment of the present disclosure.

FIG. 5 illustrates an artificial intelligence (AI) server according to an embodiment of the present disclosure.

Referring to FIG. 5, an AI server 500 may refer to a device that learns an artificial neural network by using a machine learning algorithm or uses a learned artificial neural network.

The AI server 500 may include a plurality of servers to perform distributed processing, or may be defined as a 5G network.

The AI server 500 may be included as a partial configuration of the AI device 100, and may perform at least part of the AI processing together.

The AI server 500 may include a communication unit 510, a memory 530, a learning processor 540, and a processor 560.

The communication unit 510 transmit and receive data to and from an external device such as the display device 100.

The memory 530 may include a model storage unit 531.

The model storage unit 531 may store a learning or learned model (or an artificial neural network 531*a*) through the learning processor 540.

The learning processor 540 may learn the artificial neural network 531*a* by using the learning data. The learning model may be used in a state of being mounted on the AI server 500 of the artificial neural network, or may be used in a state of being mounted on an external device such as the display device 100.

The learning model may be implemented in hardware, software, or a combination of hardware and software. If all or part of the learning models are implemented in software, one or more instructions that constitute the learning model may be stored in the memory 530.

The processor 560 may infer the result value for new input data by using the learning model and may generate a response or a control command based on the inferred result value.

Figure 6:
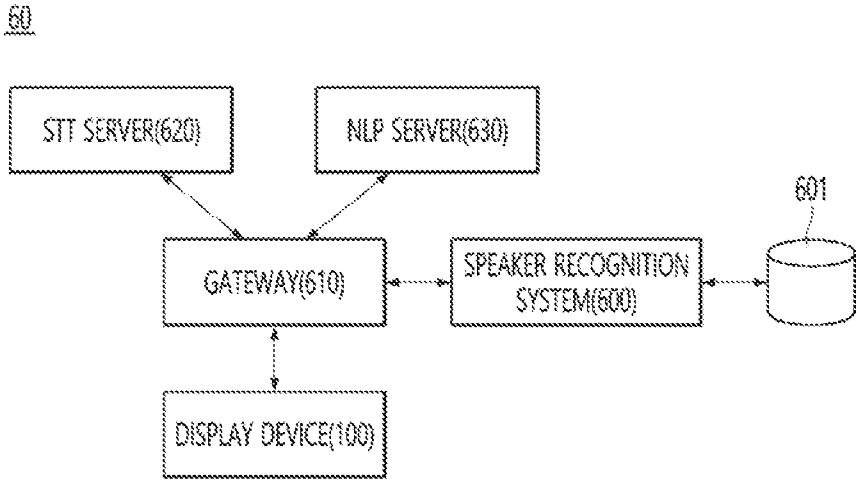
FIG. 6 is a diagram for explaining a configuration of a speaker recognition system according to an embodiment of the present disclosure.

FIG. 6 is a diagram for explaining a configuration of a speaker recognition system according to an embodiment of the present disclosure.

Referring to FIG. 6, a speaker recognition system 60 may include the display device 100, a gateway 610, a speech-to-text (STT) server 620, a natural language processing (NLP) server 630, and a speaker recognition server 600.

Components constituting the speaker recognition system 60 may perform wireless communication with each other. Wireless communication may be Internet communication.

The speaker recognition server 600 may be referred to as a speaker recognition device.

The display device 100 may obtain a first voice command uttered by a speaker.

The display device 100 may transmit a first voice signal and first voice input channel information, which correspond to the first voice command, to the speaker recognition server 600 through the network interface 133.

The processor 560 of the speaker recognition server 600 may obtain a first voice feature set indicating features of the first voice signal and store a speaker profile including the first voice feature set and the first voice input channel information in the memory 530 or a speaker database 601.

The processor 560 of the speaker recognition server 600 may transmit a speaker registration notification to the display device 100 through the communication unit 510.

The controller 170 of the display device 100 may output the speaker registration notification received from the speaker recognition server 600.

The controller 170 of the display device 100 may obtain a second voice command uttered by the speaker after a speaker registration process.

The controller 170 of the display device 100 may transmit a second voice signal and second voice input channel information, which correspond to the second voice command, to the speaker recognition server 600 through the network interface 133.

The processor 560 of the speaker recognition server 600 may determine whether the first voice input channel and the second voice input channel are the same.

When determining that the first voice input channel and the second voice input channel are the same, the processor 560 of the speaker recognition server 600 may perform a speaker identification process.

When determining that the first voice input channel and the second voice input channel are not the same, the processor 560 of the speaker recognition server 600 may determine whether a similarity between the first voice signal and the second voice signal is equal to or greater than a first similarity.

When determining that the similarity between the first voice signal and the second voice signal is equal to or greater than the first similarity, the processor 560 of the speaker recognition server 600 may transmit a speaker identification notification to the display device 100 through the communication unit 510.

When determining that the similarity between the first voice signal and the second voice signal is less than the first similarity, the processor 560 of the speaker recognition server 600 may determine whether the similarity is equal to or greater than a second similarity less than the first similarity.

When the similarity is less than the second similarity, the processor 560 of the speaker recognition server 600 may transmit a speaker registration notification for registering a speaker with another account to the display device 100 through the communication unit 510.

When determining that the similarity is equal to or greater than the second similarity, the processor 560 of the speaker recognition server 600 may transmit a speaker matching confirmation notification to the display device 100 through the communication unit 510.

According to an embodiment, the speaker matching confirmation notification may be a notification to confirm that a currently speaking speaker is matched to a previously stored speaker.

The processor 560 of the speaker recognition server 600 may receive a confirmation message indicating that the speakers are matched to each other, from the display device 100.

The processor 560 of the speaker recognition server 600 may update a speaker profile upon receiving the confirmation message.

The gateway 610 may transmit a voice signal transmitted from the display device 100, to the speaker recognition server 600 or the STT server 620.

The gateway 610 may be omitted. In this case, the display device 100 may transmit the voice signal directly to the speaker recognition server 600 or the STT server 620.

The STT server 620 may convert the voice signal into text data.

The STT server 620 may transmit the converted text data to the speaker recognition server 600 or the NLP server 630.

The NLP server 630 may obtain an intention analysis result based on the text data received from the STT server 620 by using the NLP engine.

The NLP server 630 may transmit the obtained intention analysis result to the display device 100 through the gateway 610.

The speaker database 601 may be included in the speaker recognition server 600 or may be separately provided from the speaker recognition server 600.

The speaker database 601 may store a speaker profile corresponding to each speaker.

The speaker profile may include an embedding vector including a plurality of voice input channels and voice features matched to each voice input channel.

Hereinafter, a speaker registration process may be a process of extracting features of voice uttered by a specific speaker using a voice recognition technology and matching and storing the extracted features to speaker information.

The speaker identification process may be a process of identifying whether a pre-registered speaker is identical to a currently speaking speaker.

The speaker registration process and the speaker identification process may be processes for providing personalized voice recognition services.

Figure 7:
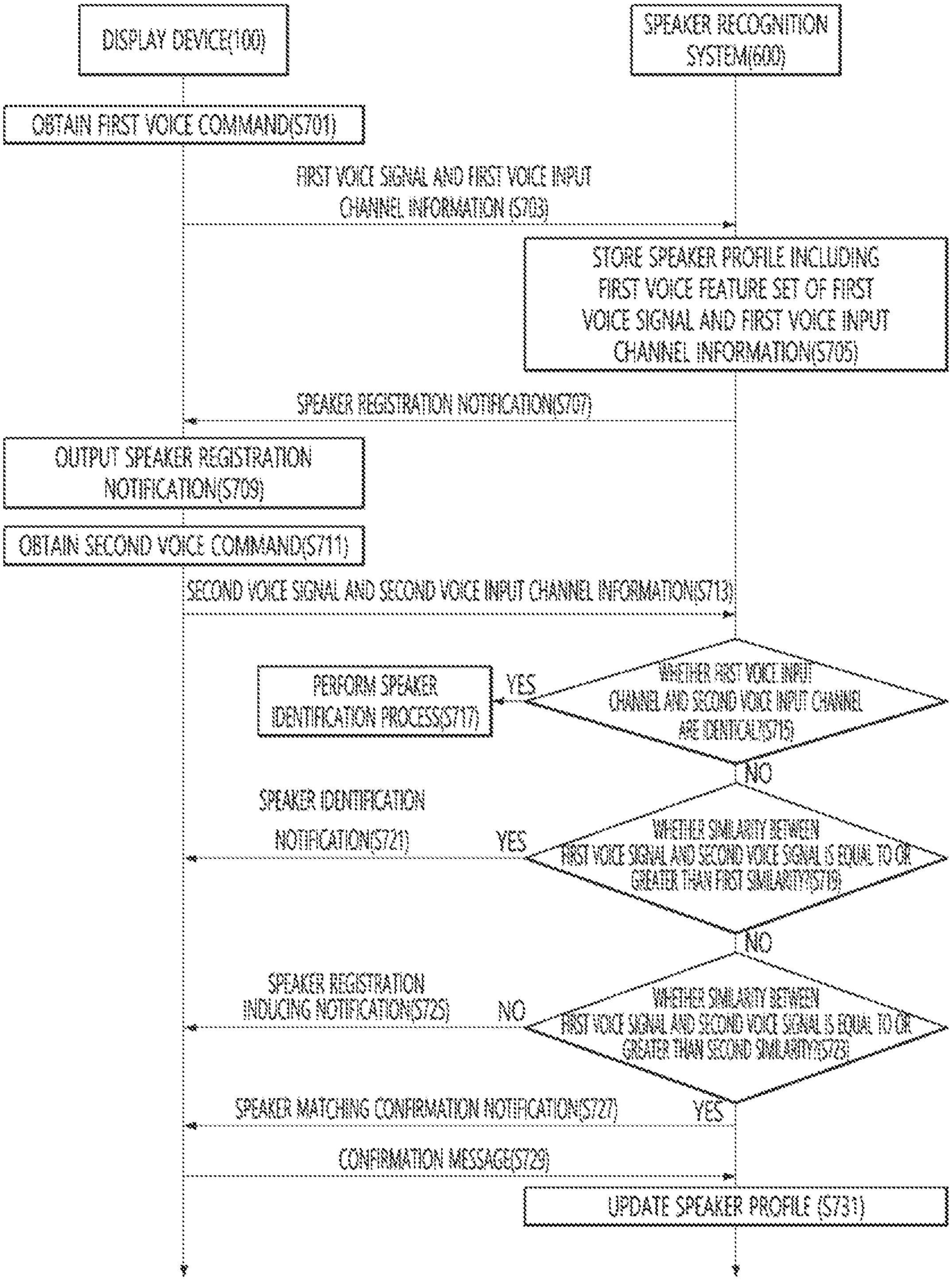
FIG. 7 is a ladder diagram for explaining an operating method of a speaker recognition system according to an embodiment of the present disclosure.

FIG. 7 is a ladder diagram for explaining an operating method of a speaker recognition system according to an embodiment of the present disclosure.

Referring to FIG. 7, the controller 170 of the display device 100 may obtain a first voice command uttered by a speaker (S701).

The controller 170 may display a speaker registration image for speaker registration on the display 180 according to a speaker registration request.

The speaker registration image may be an image for registering a speaker using a voice command that is uttered for a keyword by the speaker.

The controller 170 may obtain a first voice command through any one of a plurality of voice input channels.

The voice input channel may be a device receiving the voice command uttered by the speaker.

The plurality of voice input channels may include a microphone, a headphone, mobile devices, or the like, which are included in the remote control device 200 or the display device 100.

Figures 8A, 8B:
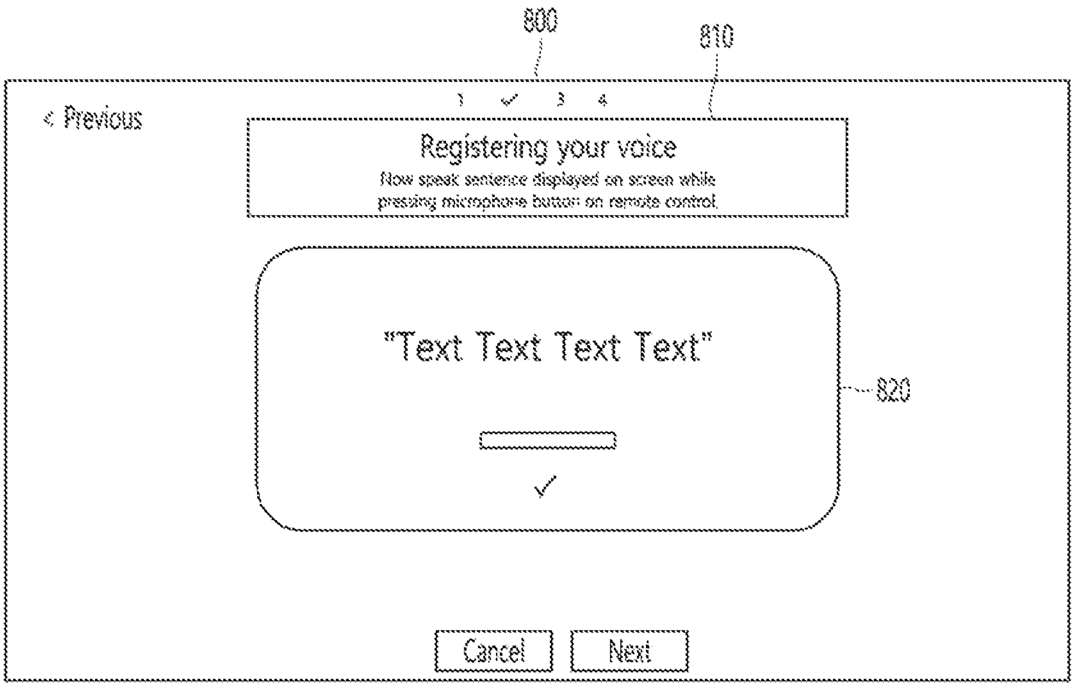
FIG. 8A is a diagram for explaining a speaker registration image according to an embodiment of the present disclosure.
FIG. 8B is a diagram for explaining keywords provided through the speaker registration image.
Figure 8C:
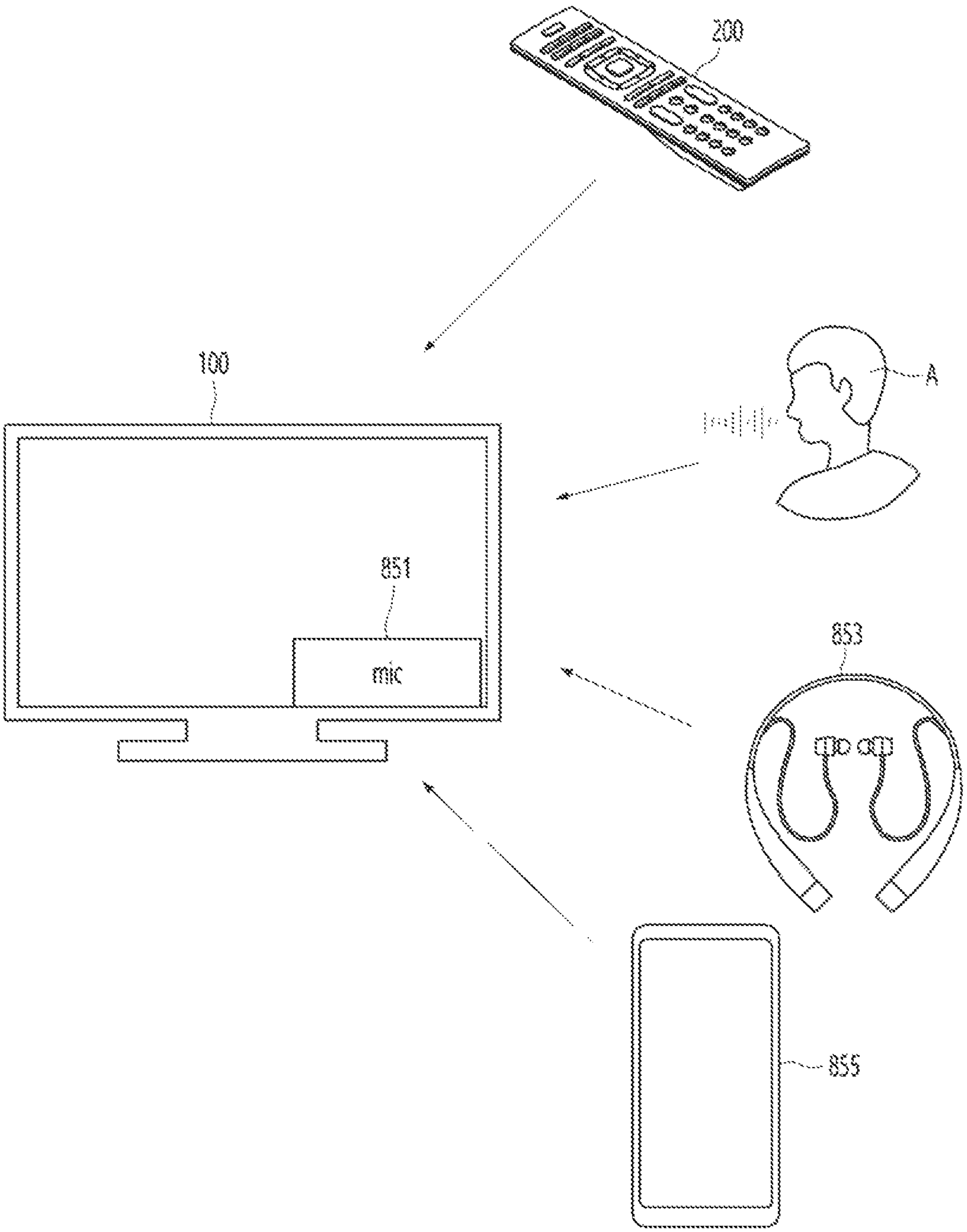
FIG. 8C is a diagram for explaining a plurality of voice input channels.

FIG. 8A is a diagram for explaining a speaker registration image according to an embodiment of the present disclosure. FIG. 8B is a diagram for explaining keywords provided through the speaker registration image. FIG. 8C is a diagram for explaining a plurality of voice input channels.

Referring to FIG. 8A, the display device 100 may display a speaker registration image 800 on the display 180 upon receiving the speaker registration request.

The display device 100 may receive the speaker registration request through the remote control device 200.

The speaker registration image 800 may include an utterance inducing text 810 that induces the speaker to utter an utterance and a keyword window 820 containing a keyword.

A user utters the keyword included in the keyword window 820. In the keyword window 820, each of a plurality of keywords as shown in FIG. 8B may be sequentially displayed according to utterance of the user.

The display device 100 may obtain a voice command corresponding to each uttered keyword through a specific voice input channel.

The display device 100 may obtain a voice command corresponding to the keyword through any one of a plurality of input channels 200, 851, 853, and 855 shown in FIG. 8C.

The first voice input channel may be a microphone provide in the remote control device 200.

The remote control device 200 may transmit the voice command uttered by the speaker to the user interface 150 of the display device 100 through the wireless communication module 220.

The second voice input channel may be a microphone 851 provided in the display device 100, which directly collects voice uttered by a speaker A.

The third voice input channel may be a microphone provided in a headphone 853 of a speaker.

The headphone 853 may transmit a voice signal corresponding to a voice command to the wireless communication interface 173 of the display device 100 through short-distance wireless communication.

The fourth voice input channel may be a microphone provided in a mobile device 855 such as a smartphone of a speaker. The mobile device 855 may transmit a voice command uttered by the speaker to the wireless communication interface 173 of the display device 100 through short-distance wireless communication.

As such, the display device 100 may obtain a voice command uttered by a speaker through various voice input channels.

FIG. 7 will be described again.

The controller 170 of the display device 100 may transmit the first voice signal and first voice input channel information, which correspond to the first voice command, to the speaker recognition server 600 through the network interface 133 (S703).

The first voice input channel information may include a voice input channel indicating a source that collects the first voice command.

The first voice input channel information may include information identifying the voice input channel, such as a name of a voice input channel or a model of the voice input channel.

The controller 170 may transmit first voice input channel information including the first voice signal corresponding to the first voice command and the voice input channel indicating a device obtaining the first voice command to the communication unit 510 of the speaker recognition server 600.

The processor 560 of the speaker recognition server 600 may obtain a first voice feature set indicating features of the first voice signal and store a speaker profile including the first voice feature set and the first voice input channel information in the memory 530 (S705).

The processor 560 may extract the first voice feature set including voice features from the first voice signal. The voice features may include one or more of frequency features, a sound level, and a pitch.

The processor 560 may extract voice features from the voice signal using a Mel-frequency cepstral coefficients (MFCC) scheme.

The MFCC scheme may be a scheme of segmenting a voice signal into a plurality of frequency bands and calculating energy in each frequency band.

The processor 560 may obtain a first embedding vector indicating a first voice feature set from the first voice signal through the MFCC scheme.

The processor 560 may generate a speaker profile obtained by matching the first voice feature set or the first embedding vector to the first voice input channel information.

The processor 560 may store the generated speaker profile in the memory 530 or the speaker DB 601. The speaker profile may further include speaker account information. The speaker profile may include one or more of a speaker ID or a speaker name. The speaker account information may be transmitted to the speaker recognition server 600 together with the first voice signal and the first voice input channel information in operation S703.

The processor 560 of the speaker recognition server 600 may transmit the speaker registration notification to the display device 100 through the communication unit 510 (S707).

After generating the speaker profile, the processor 560 may transmit a speaker registration notification indicating that a speaker is registered in a personalized voice recognition service to the display device 100 through the communication unit 510.

The controller 170 of the display device 100 may output the speaker registration notification received from the speaker recognition server 600 (S709).

The controller 170 may display the speaker registration notification on the display 180.

Operations S701 to S709 may be a speaker registration process of providing a voice recognition service only to a speaker identified by recognizing voice of the speaker.

After the speaker registration process, the controller 170 of the display device 100 may obtain a second voice command uttered by the speaker (S711).

The controller 170 may obtain the second voice command through any one of a plurality of voice input channels.

The controller 170 of the display device 100 may transmit the second voice signal and the second voice input channel information, which correspond to the second voice command, to the speaker recognition server 600 through the network interface 133 (S713).

The controller 170 may transmit second voice input channel information including the second voice signal and second voice input channel information indicating a device obtaining the second voice command, to the speaker recognition server 600 through the network interface 133.

The second voice input channel information may include one or more of a name of a voice input channel receiving the second voice command or a model name of the voice input channel.

In addition to the second voice signal and second voice input channel information, the controller 170 may also transmit account information of a speaker logged in to the display device 100 to the speaker recognition server 600.

The processor 560 of the speaker recognition server 600 may determine whether the first voice input channel and the second voice input channel are the same (S715).

The processor 560 may determine whether the first voice input channel contained in the speaker profile stored in the memory 530 and the second voice input channel contained in the second voice input channel information are the same.

When determining that the first voice input channel and the second voice input channel are the same, the processor 560 of the speaker recognition server 600 may perform a speaker identification process (S717).

The speaker identification process may be a process of comparing the first embedding vector stored in the speaker profile with the second embedding vector of the second voice signal to determine whether the speakers are matched to each other.

The processor 560 may extract the second embedding vector indicating the voice features of the second voice signal using from the second voice signal, using an MFCC scheme.

The processor 560 may calculate a similarity between the first embedding vector and the second embedding vector, and when the calculated similarity is equal to or greater than a preset similarity, the processor 560 may determine that a speaker of the first voice command is the same as a speaker of the second voice command.

The similarity between the first embedding vector and the second embedding vector may be a cost for identifying a speaker. The similarity may be referred to as a speaker identification cost.

The preset similarity may be a first similarity to be described below.

When determining that the first voice input channel and the second voice input channel are not the same, the processor 560 of the speaker recognition server 600 may determine whether a similarity between the first voice signal and the second voice signal is equal to or greater than a first similarity (S719).

The processor 560 may calculate a similarity between the first embedding vector of the first voice signal and the second embedding vector of the second voice signal.

When determining that the similarity between the first voice signal and the second voice signal is equal to or greater than the first similarity, the processor 560 of the speaker recognition server 600 may transmit a speaker identification notification to the display device 100 through the communication unit 510 (S721).

The speaker identification notification may be a notification indicating that a speaker of the first voice command and a speaker of the second voice command are the same to recognize a speaker.

Then, the display device 100 may obtain an analysis result of the second voice command from the NLP server 630 and output the obtained analysis result.

Figure 9:
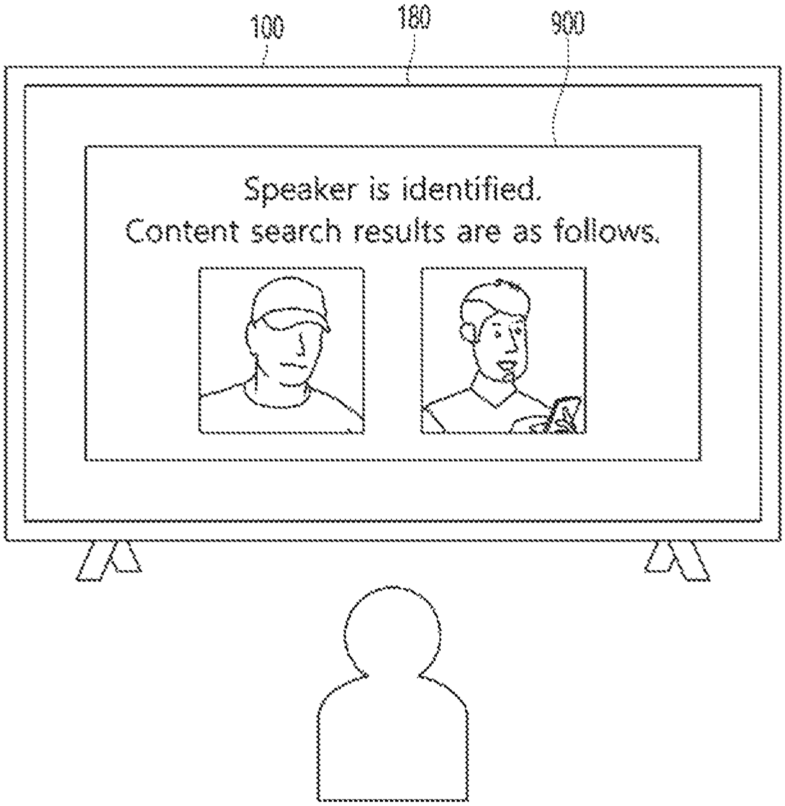
FIG. 9 is a diagram for explaining a case in which a speaker who speaks is identified through the same voice input channel according to an embodiment of the present disclosure.

FIG. 9 is a diagram for explaining a case in which a speaker who speaks is identified through the same voice input channel according to an embodiment of the present disclosure.

When determining that the similarity between the first voice signal and the second voice signal is equal to or greater than the first similarity, the display device 100 may display an analysis result 900 of the second voice command on the display 180.

The analysis result 900 may include a search result of content as an intention analysis result of the second voice command.

The speaker recognition server 600 may transmit a notification indicating that the speaker is identified, to the NLP server 630. The NLP server 630 may obtain an analysis result of the second voice command, based on text data of the second voice command, according to the received notification. The NLP server 630 may transmit the analysis result to the display device 100.

FIG. 7 will be described again.

When determining that the similarity between the first voice signal and the second voice signal is less than the first similarity (S719), the processor 560 of the speaker recognition server 600 may determine whether the similarity is equal to or greater than a second similarity less than the first similarity (S723).

The second similarity may be a standard to cover a case in which a voice signal uttered by the same speaker is changed depending on the characteristics of microphones of different voice input channels.

When the similarity is less than the second similarity, the processor 560 of the speaker recognition server 600 may transmit a speaker registration notification for registering a speaker with another account (new account) to the display device 100 through the communication unit 510 (S725).

That is, when the similarity is less than the second similarity, the processor 560 may determine that a speaker of a first voice command and a speaker of a second voice command are different from each other.

The processor 560 may transmit a speaker registration notification for inducing speaker registration with another account, to the display device 100.

Figure 10:
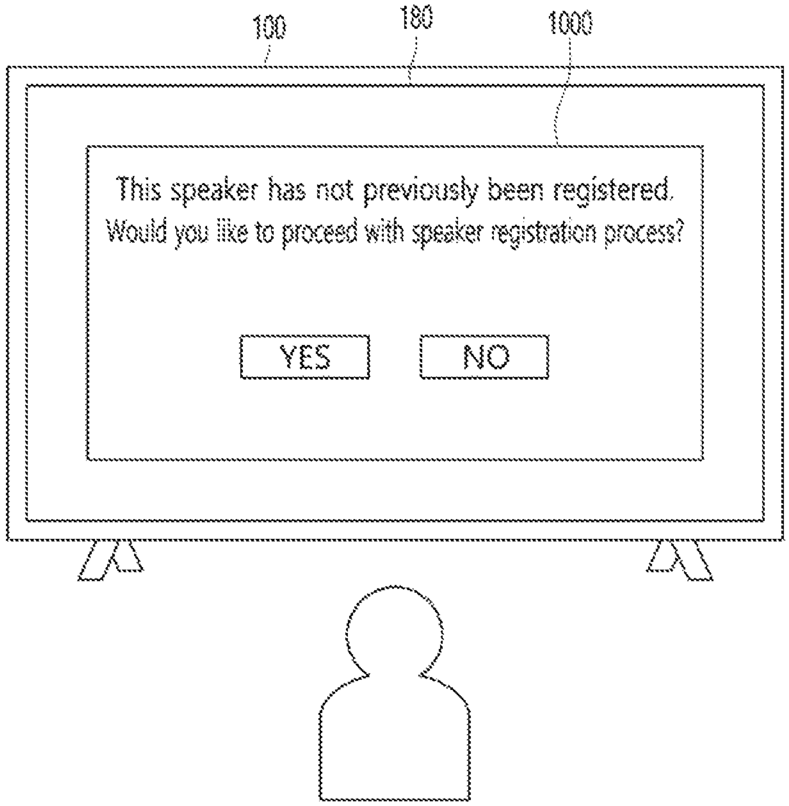
FIG. 10 is a diagram for explaining an example in which a speaker registration notification for inducting speaker registration with another account is output according to an embodiment of the present disclosure.

FIG. 10 is a diagram for explaining an example in which a speaker registration notification for inducting speaker registration with another account is output according to an embodiment of the present disclosure.

Referring to FIG. 10, when the similarity is less than the second similarity, the processor 560 of the speaker recognition server 600 may transmit the speaker registration notification for speaker registration with another account to the display device 100 through the communication unit 510.

The display device 100 may display a speaker registration notification 1000 on the display 180.

When receiving a confirmation command through the speaker registration notification 1000, the display device 100 may display the speaker registration image 800 as shown in FIG. 8A.

FIG. 7 will be described again.

When determining that the similarity is equal to or greater than the second similarity (S723), the processor 560 of the speaker recognition server 600 may transmit a speaker matching confirmation notification to the display device 100 through the communication unit 510 (S727).

According to an embodiment, the speaker matching confirmation notification may be a notification for confirming that a currently speaking speaker is matched to a pre-stored (or registered) speaker.

The processor 560 of the speaker recognition server 600 may receive a confirmation message indicating that the speakers are matched to each other, from the display device 100 (S729).

The processor 560 of the speaker recognition server 600 may update the speaker profile upon receiving the confirmation message (S731).

Figure 11A:
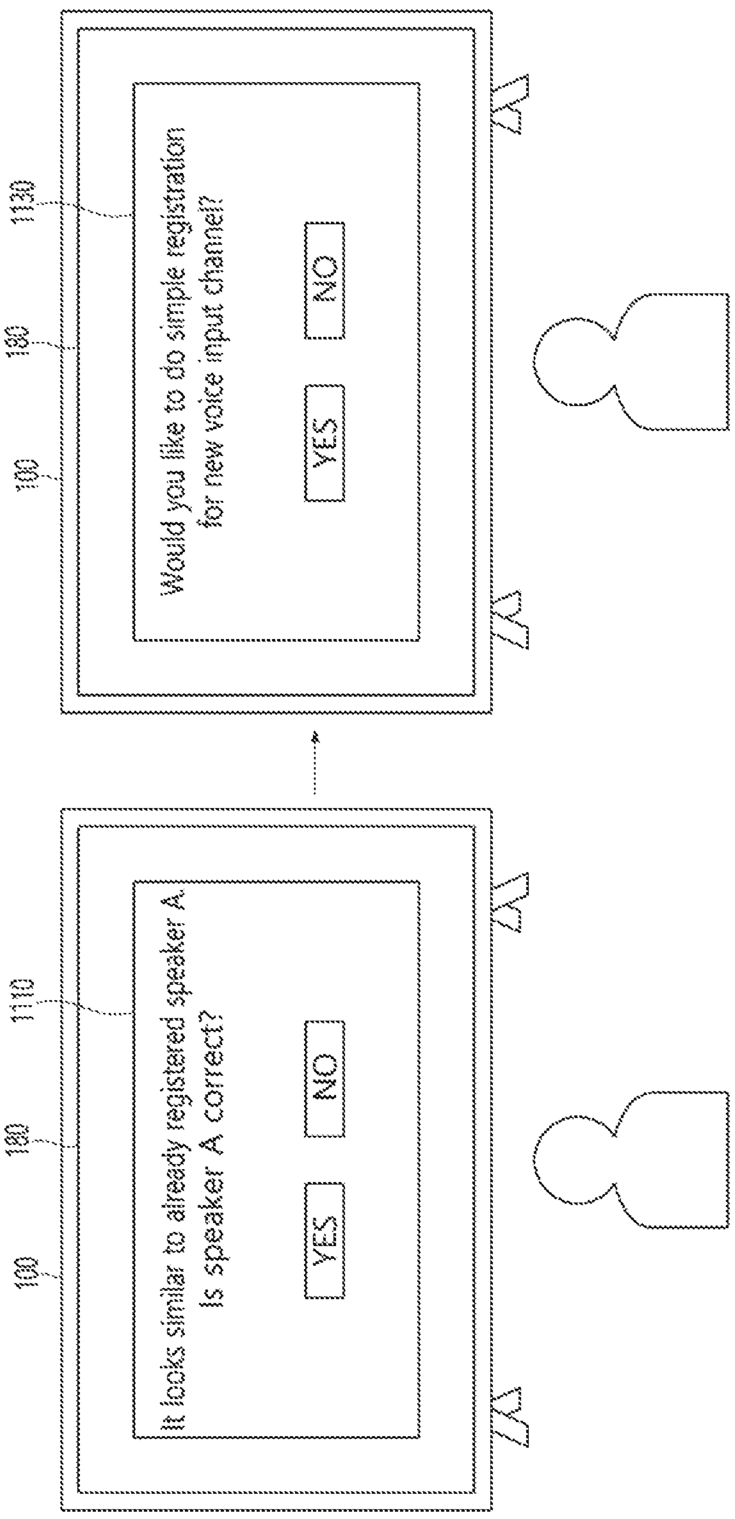
FIGS. 11A to 11C are diagrams for explaining a process of updating an existing speaker profile by adding information on a new voice input channel for the same speaker according to an embodiment of the present disclosure.
Figure 11B:
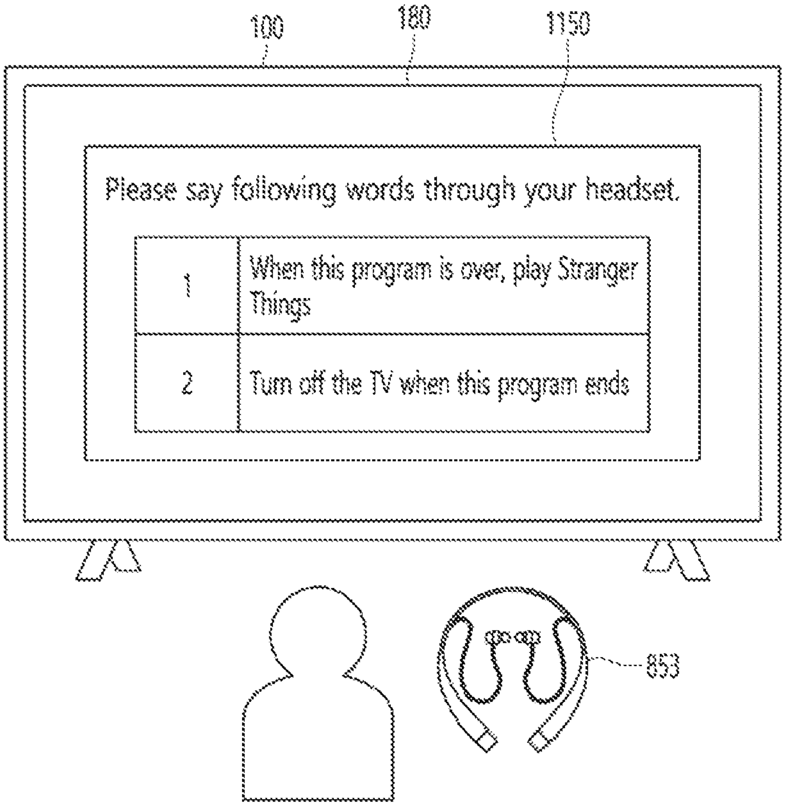
Figure 11C:
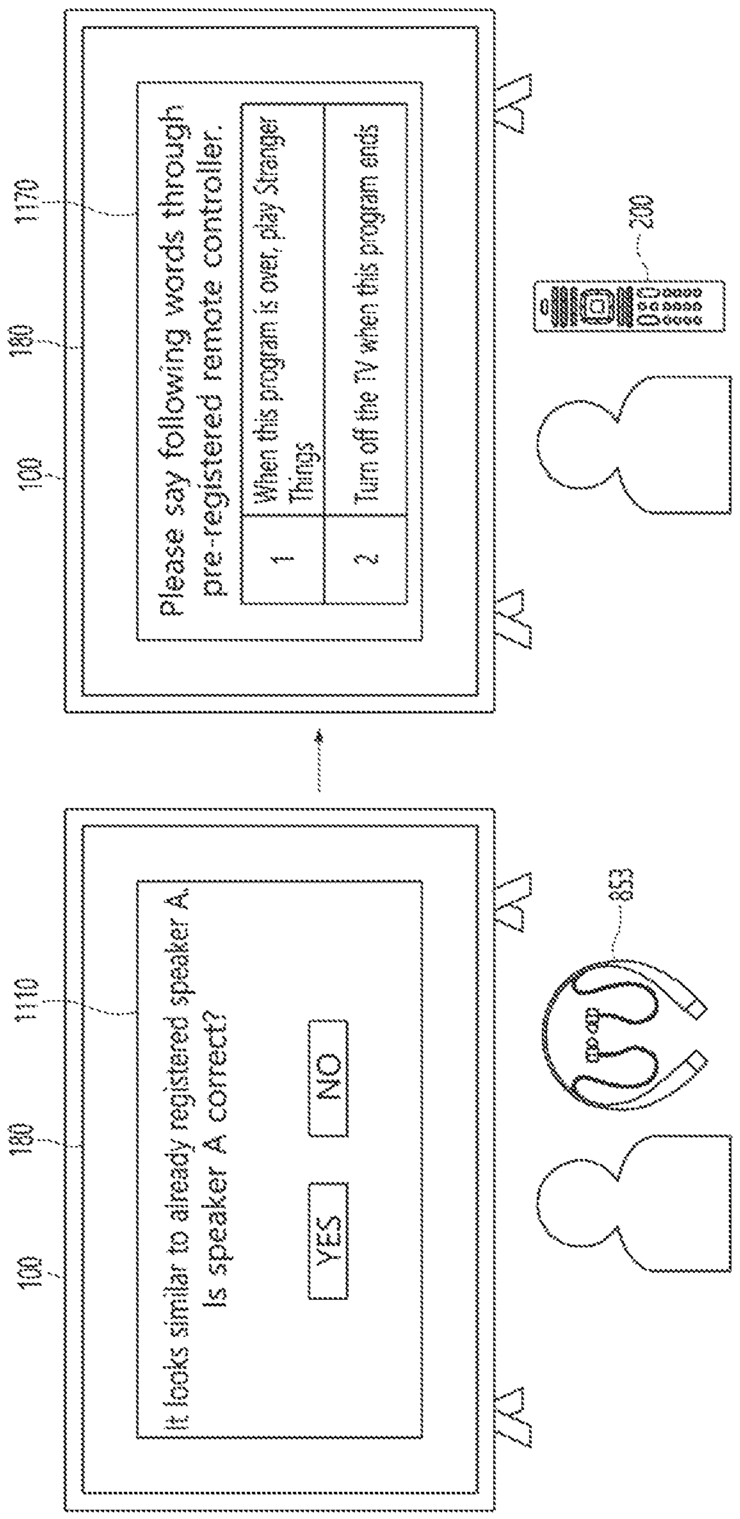

FIGS. 11A to 11C are diagrams for explaining a process of updating an existing speaker profile by adding information on a new voice input channel for the same speaker according to an embodiment of the present disclosure.

Referring to FIG. 11A, the display device 100 may display a first pop-up window 1110 on the display 180 upon receiving a speaker matching confirmation notification from the speaker recognition server 600.

In FIGS. 11A to 11C, it is assumed that a voice input channel pre-registered in a speaker profile is the remote control device 200 and a new voice input channel is a headset 853.

The first pop-up window 1110 may include a text inquiring whether a pre-registered speaker and a current speaker are similar and is matched thereto.

The display device 100 may display a second pop-up window 1130 for simple registration of a new voice input channel on the display 180 upon receiving a command for selecting a consent button through the first pop-up window 1110.

The speaker recognition server 600 may respond to receiving a command to select a consent button through the first pop-up window 1110 and transmit a notification to display the second pop-up window 1130 for simple registration of a new voice input channel, to the display device 100.

The second pop-up window 1130 may be displayed to map a channel environment of the voice received through a new voice input channel to the speaker even if the speaker is identified.

When the consent button is selected through the second pop-up window 1130, the display device 100 may display a keyword inducing window 1150 that induces utterance of a keyword through a new voice input channel on the display 180 as shown in FIG. 11B.

The keyword inducing window 1150 may include two keywords.

The speaker may sequentially utter the two keywords included in the keyword inducing window 1150 through the headset 853.

The headset 853 may transmit voice commands corresponding to the uttered keywords to the display device 100, and the display device 100 may transmit the voice commands and the voice input channel information to the speaker recognition server 600.

The speaker recognition server 600 may extract voice features from voice command and generate an embedding vector based on the extracted voice features.

The speaker recognition server 600 may add the generated embedding vector and information on the headset 853 as a new voice input channel to a pre-stored speaker profile.

Thus, the speaker profile may be updated.

According to an embodiment of the present disclosure, even if the speaker utters voice through the remote control device 200 or the headset 853 as a new voice input channel, the speaker may be normally recognized.

That is, according to an embodiment, even if the speaker utters voice through various voice input channels, speaker recognition performance may be improved.

A first embedding vector corresponding to the first voice input channel stored in the speaker profile and a second embedding vector corresponding to a new second voice input channel may be different.

A difference between the first embedding vector and the second embedding vector may be stored in the speaker profile.

According to another embodiment of the present disclosure, when receiving a command for selecting a consent button through the first pop-up window 1110, the display device 100 may display a third pop-up window 1170 requesting utterance of a keyword through the remote control device 200 that is pre-registered.

The speaker recognition server 600 may respond to receiving a command to select the consent button through the first pop-up window 1110 and transmit a notification that induces additional utterance of the keyword to display up window 1170 through the pre-registered remote control device 200.

The display device 100 may transmit voice commands for keyword uttered by the speaker through the remote control device 200 to the speaker recognition server 600.

When recognizing that the speaker is a speaker that is a pre-registered through the speaker identification process, the speaker recognition server 600 may store information on voice features of the voice commands uttered through the headset 853 and the headset 853 as a voice input channel, in the speaker profile.

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The display device described above is not limited to the configuration and method of the above-described embodiments, but the above embodiments may be configured by selectively combining all or part of each embodiment so that various modifications can be made.

What is claimed is:

1. A speaker recognition device comprising:

a communication interface configured to communicate with an electronic device;

a memory configured to store a speaker profile including a first voice feature set including voice features of a first voice signal and a first voice input channel matched to the first voice signal; and a processor configured to receive a second voice signal corresponding to a voice command uttered by a speaker and information on a second voice input channel indicating a device obtaining the voice command, from an electronic device, obtain a similarity between the first voice feature set and a second voice feature set including voice features of the second voice signal, based on that the second voice input channel is not the first voice input channel stored in the memory, transmit a notification indicating that the speaker is identified, to the electronic device, based on the obtained similarity being equal to or greater than a first similarity, transmit a notification for checking that the speaker is matched to a pre-registered speaker, to the electronic device, based on the similarity being less than the first similarity and equal to or greater than a second similarity less than the first similarity, and transmit a notification for registering a new speaker to the electronic device, based on the similarity being less than the second similarity.

2. The speaker recognition device of claim 1, wherein the processor compares a first embedding vector indicating the first voice feature set with a second embedding vector indicating the second voice feature set to obtain the similarity.

3. The speaker recognition device of claim 1, wherein each of the first voice input channel and the second voice input channel includes any one of a remote control device, the electronic device, and a mobile device, each including a microphone.

4. A speaker recognition device comprising:

a communication interface configured to communicate with an electronic device;

a memory configured to store a speaker profile including a first voice feature set including voice features of a first voice signal and a first voice input channel matched to the first voice signal; and a processor configured to receive a second voice signal corresponding to a voice command uttered by a speaker and information on a second voice input channel indicating a device obtaining the voice command, from an electronic device, obtain a similarity between the first voice feature set and a second voice feature set including voice features of the second voice signal, based on the second voice input channel being different from the first voice input channel stored in the memory, transmit a notification indicating that the speaker is identified, to the electronic device, based on the obtained similarity being equal to or greater than a first similarity, and transmit a notification for registering the second voice input channel to the electronic device, based on the similarity being less than the first similarity and equal to or greater than a second similarity less than the first similarity.

5. The speaker recognition device of claim 4, wherein the processor is configured to obtain additional voice features of an additional voice signal corresponding to an additional voice command obtained through the second voice input channel, from the electronic device, and update the information on the second voice input channel and the additional voice features, to the speaker profile.

6. An operating method of a speaker recognition device, the method comprising:

storing a speaker profile including a first voice feature set including voice features of a first voice signal and a first voice input channel matched to the first voice signal;

receiving a second voice signal corresponding to a voice command uttered by a speaker and information on a second voice input channel indicating a device obtaining the voice command, from an electronic device;

obtaining a similarity between the first voice feature set and a second voice feature set including voice features of the second voice signal, based on that the second voice input channel is not the stored first voice input channel; and transmitting a notification indicating that the speaker is identified, to the electronic device, based on the obtained similarity being equal to or greater than a first similarity, transmitting a notification for checking that the speaker is matched to a pre-registered speaker, to the electronic device, based on the similarity being less than the first similarity and equal to or greater than a second similarity less than the first similarity, and transmitting a notification for registering a new speaker to the electronic device, based on the similarity being less than the second similarity.

7. The method of claim 6, wherein the obtaining of the similarity includes comparing a first embedding vector indicating the first voice feature set with a second embedding vector indicating the second voice feature set to obtain the similarity.

8. The method of claim 6, further comprising, based on that the similarity is less than the first similarity and is equal to or greater than a second similarity less than the first similarity, transmitting a notification for registering the second voice input channel to the electronic device.

9. The method of claim 8, further comprising:

obtaining additional voice features of an additional voice signal corresponding to an additional voice command obtained through the second voice input channel, from the electronic device; and updating the information on the second voice input channel and the additional voice features, to the speaker profile.

* * * * *